United States Patent
Kim et al.

(10) Patent No.: US 7,085,316 B1
(45) Date of Patent: Aug. 1, 2006

(54) METHOD AND APPARATUS FOR THE CONTROL OF MODEM TRANSMIT POWER

(75) Inventors: Dae-Young Kim, Lexington, MA (US); Sepehr Mehrabanzad, Southborough, MA (US); John Pilozzi, Stow, MA (US)

(73) Assignee: General Electric Co., New York, NY (US)

( * ) Notice: Subject to any disclaimer, the term of this patent is extended or adjusted under 35 U.S.C. 154(b) by 0 days.

(21) Appl. No.: 09/499,014

(22) Filed: Feb. 4, 2000

(51) Int. Cl.
*H04B 1/38* (2006.01)

(52) U.S. Cl. .................................................. 375/222

(58) Field of Classification Search ............... 375/222, 375/216, 345, 377, 223, 268; 379/93.01, 379/27; 455/69, 250.1, 572, 574
See application file for complete search history.

(56) References Cited

U.S. PATENT DOCUMENTS

| | | | | |
|---|---|---|---|---|
| 5,265,151 A | * | 11/1993 | Goldstein | 379/93.32 |
| 5,844,940 A | * | 12/1998 | Goodson et al. | 375/222 |
| 5,991,278 A | * | 11/1999 | Betts | 370/276 |
| 6,163,570 A | * | 12/2000 | Olafsson | 375/223 |
| 6,195,384 B1 | * | 2/2001 | Dagdeviren | 375/222 |
| 6,201,842 B1 | * | 3/2001 | Kim | 375/346 |
| 6,240,124 B1 | * | 5/2001 | Wiedeman et al. | 370/318 |
| 6,304,749 B1 | * | 10/2001 | Obara | 330/129 |
| 6,467,092 B1 | * | 10/2002 | Geile et al. | 725/131 |

OTHER PUBLICATIONS

PCT International Search Report, PCT/US01/03415 filed Feb. 1, 2001, 3 pgs.

* cited by examiner

*Primary Examiner*—Khai Tran
(74) *Attorney, Agent, or Firm*—Kenneth R. Glick

(57) ABSTRACT

A method and apparatus is provided for controlling the transmit power of an analog modem when the transmit power level does not match the desired transmit power level, thus conforming to FCC regulations on transmit power and/or eliminating non-linearities associated with higher than required power levels and loss of signal-to-noise ratio and concomitant at loss of data rate if the transmit power levels are less than that desired. In one embodiment, the power level at the analog modem is sensed to ascertain if it is not at the desired transmit power level, with adjustment being provided by transmitting the desired change in the transmit power level to the digital modem, whereupon mapping parameters are redefined by adjusting the number of equivalence classes, thus to adjust transmit power at analog modem.

22 Claims, 10 Drawing Sheets

BLOCK DIAGRAM HOW PRECODER AND PREFILTER WORKS

WHEN u(n) = 0, 1, OR 2

WHEN u(n) = 0, 1, 2, 3 OR 4

METHOD AND APPARATUS FOR THE CONTROL OF MODEM TRANSMIT POWER

FIELD OF INVENTION

This invention is related to the field of telecommunications and more particularly to a method in apparatus for adjusting modem power levels in a PCM modem system.

BACKGROUND OF THE INVENTION

In a PCM modem system during a startup mode, the power level of the transmitter of the analog modem is set by estimating at the digital modem what its power level should be. This is accomplished during the startup mode through the specification of mapping parameters and transmit constellation at the digital modem, with the appropriate parameters being transmitted back to the analog modem through the digital network and the analog loop. In addition to the above mapping parameters and transmit constellation, these parameters include pre-equalization parameters which are utilized to set the pre-equalization circuits within the analog modem so as to optimize the PCM modem system.

One way of assigning transmit power levels at the analog modem is to utilize the mapping parameters in which the input data is mapped to a number of equivalence classes. As will be seen, it is the number of equivalence classes which determines the power level of the analog modem transmitter.

By way of background, and as to the start up mode, a set of start up procedures is described in U.S. patent application Ser. No. 09-390,106 entitled "Method and Apparatus for a Start Up Procedure for Digital and Analog Modems Utilizing Pulse Code Modulation for Data Transmission", filed Sep. 3, 1999, assigned to the assignee here of and incorporated herein by reference.

Inherent in the startup procedure is a routine in which training signals are sent from the analog modem over the upstream channel to the digital modem. The training signals are analyzed at the digital modem so as to be able to characterize the upstream channel. Having measured the upstream channel characteristics and generated transmit constellations to satisfy a certain decoding error probability, the digital modem generates mapping parameters for use with a given transmit constellation. The transmit constellation refers to the specific levels or steps used in the PCM modulation scheme. Given that during startup the digital modem measures upstream channel characteristics, it subsequently estimates the appropriate transmit power level for the analog modem to provide robust communication while satisfying FCC regulations on transmit power.

However, estimating the analog modem transmit power at the digital modem can only result in an approximation of the required transmit level for the transmitter in the analog modem. The estimation is by its very nature inexact and results in non-linearities and downstream performance degradation if the transmit power level is higher than that desired. Moreover, if the transmit power level at the analog modem is too low, the data rate declines.

In addition to non-optimal power levels engendered by the variability of the upstream channel, is also important that the analog modem's transmit power levels be kept within limits set by the Federal Communication Commission. In the present FCC regulation (Part 68) the average power level from the analog modem must be less than −9 dBm. Normally however, the optimal power level for the analog modem transmitter is less than −12 dBm to provide better downstream performance. As the analog modem transmit power increases, downstream higher echo power will be experienced and there will be a larger noise component due to imperfect echo cancellation.

What will be appreciated is that the setting of the analog modem transmitter power level is accomplished remotely from the digital modem. This is done in one embodiment by specifying the number of equivalence classes to which the incoming data is mapped. As will be seen hereinafter, the power level at the analog transmitter is proportional to the number of equivalence classes. Thus, when during startup the upstream channel is measured, the power level estimation is provided through the specification of a trial number of equivalence classes to be used.

SUMMARY OF THE INVENTION

To check if the mapping parameters designed by digital modem provides appropriate analog modem transmit power, in the subject system the transmit power level is measured at the analog modem. The difference between the measured transmit level and the desired transmit level is then utilized to adjust the transmit power level of the analog modem's transmitter.

In one embodiment, this is accomplished by having the analog modem transmit the desired change in power level to the digital modem, whereupon the digital modem redefines the equivalence classes. This is done by either increasing or decreasing the number of equivalence classes utilized. When the proper number of equivalence classes has been established from the information transmitted by the analog modem, the equivalence classes are redefined at the digital modem and the corresponding mapping parameters are transmitted back to the analog modem for setting the transmit power level to the appropriate level.

Due to changes in the mapping structure, it may be that other parameters need to be reset. For example, analog modem transmit power increases will incur higher ISI intersymbol interference and/or higher echo in the downstream direction. Therefore, in the upstream direction there might be a need for different constellations. In the downstream direction there might be a need for different constellations. However, when the power change is small, the above-mentioned effect is small, and therefore, does not need other parameter changes.

Thus changing the mapping parameters may require changing the transmit constellation, and the filter parameters, to alter the pre-equalization circuits in the analog modem. Changing the equivalence classes can in essence change the encoding and decoding scheme utilized in PCM modulation such that not only is the power level reset at the analog modem, but all pre-equalization parameters may need to be altered in accordance with the increased or decreased number of equivalence classes.

Regardless, by measuring the power level at the analog modem and adjusting the number of equivalence classes a more accurate setting of the transmit power level at the analog modem is possible, as opposed to the level set by estimation of what it is or should be at the digital modem.

Moreover, the process outlined above is established during the data mode so that channel variations or impairments can be accommodated on-the-fly through readjustment of the transmit power level at the analog modem.

While the subject invention will be described in terms of adjusting the power levels at the analog modem, power levels at the digital modem can likewise be changed or altered. This is accomplished by having the digital modem transmit to the analog modem what the digital modem sees as required changes for the power level at the digital modem. The output power of the digital modem is not however controlled through the utilization of changes in equivalence classes, but is done more conventionally through standard power level control techniques.

In summary, a method and apparatus is provided for controlling the transmit power of an analog modem when the transmit power level does not match the desired transmit power level, thus conforming to FCC rules and/or eliminating non-linearities associated with higher than required power levels and loss of signal-to-noise ratio and concomitant at loss of data rate if the transmit power levels are less than that desired. In one embodiment, the power level at the analog modem is sensed to ascertain if it is not at the desired transmit power level, with adjustment being provided by transmitting the desired change in the transmit power level to the digital modem, whereupon mapping parameters are redefined by adjusting the number of equivalence classes, thus to adjust transmit power at analog modem.

BRIEF DESCRIPTION OF THE DRAWINGS

This and other features of the subject invention will be better understood in connection with the Detail Description and in conjunction with the Drawings: of which.

DETAILED DESCRIPTION

Figure 1:
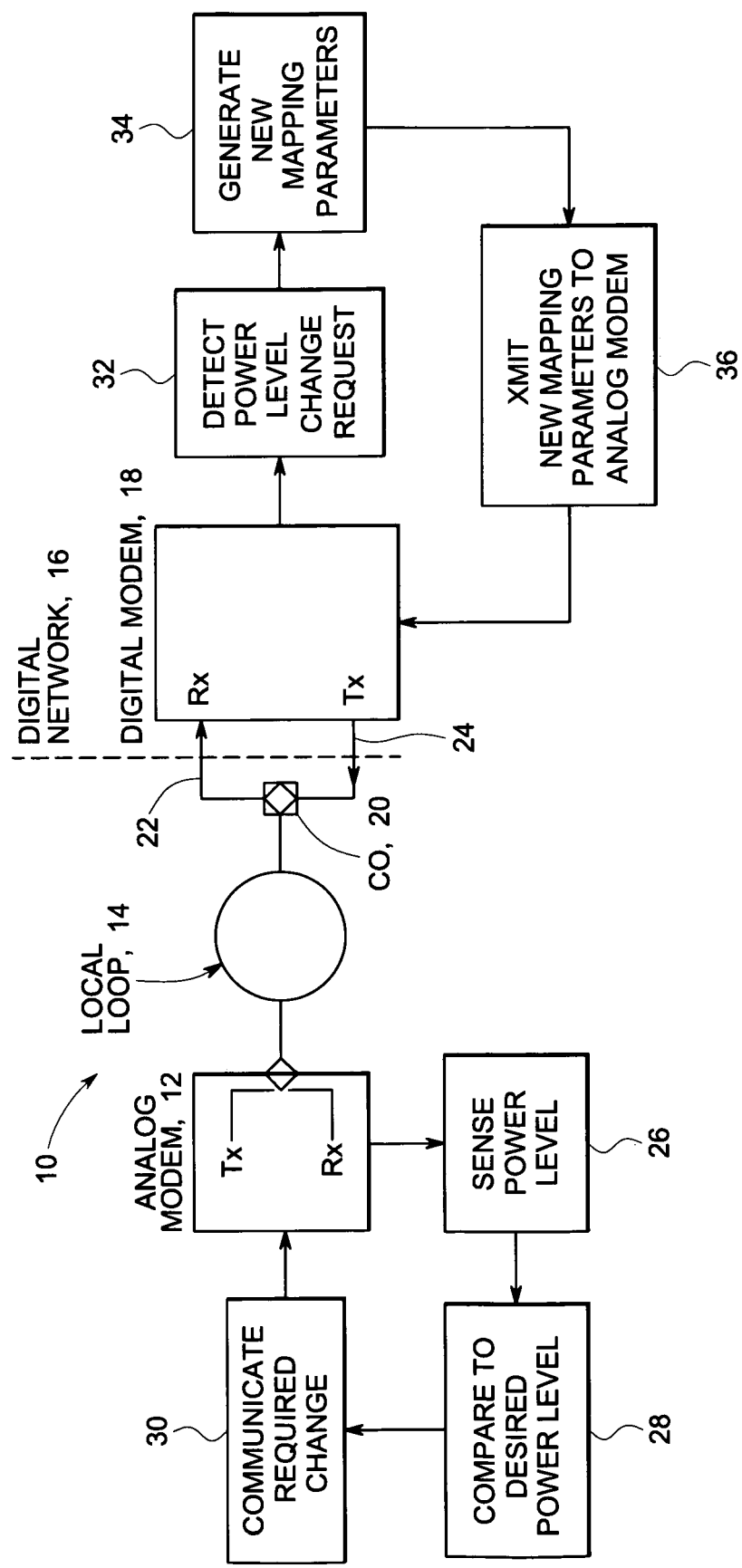
FIG. 1 is block diagram of a PCM modem system in which the power level of the analog modem is sensed and compared to the desired power level, with the appropriate change transmitted from the analog modem to the digital modem at which point new mapping parameters are transmitted back to the analog modem to reset its transmit power level.

Referring now to FIG. 1, in a typical PCM modulation system 10 an analog modem 12 is coupled to an analog loop 14 which is then coupled to a digital network 16 and thence to a digital modem 18. The connection between the analog loop and the digital network is provided at a central office 20 such that in the upstream direction signals from the analog modem are transmitted over line 22 to the receive section of the digital modem, whereas in the downstream direction signals from the digital modem are transmitted over line 24 through to the analog modem.

In one embodiment of the subject invention a unit 26 is utilized to sense the power level of the transmitter of analog modem 12, with this sensed power level being compared at 28 to a desired power level. The difference between the sensed power level and the desired power level is quantified and is communicated at 30 as the required change to be made in order that the analog modem 12 transmitter section be adjusted to the appropriate power level.

At the receive side, an output from digital modem 18 includes detection at 32 of the power level change request generated by the analog modem. This is used at 34 to generate new mapping parameters, with the new mapping parameters transmitted at 36 back to the analog modem to reset the power level of the analog modem transmitter.

In the illustrated embodiment, the power level to which the analog modem transmitter is originally set is dependant upon the number of equivalence classes utilized. This is reflected in the mapping parameters, which as mentioned hereinbefore, is established based on an estimation which is the result of measuring the upstream channel during the startup mode.

Figure 2:
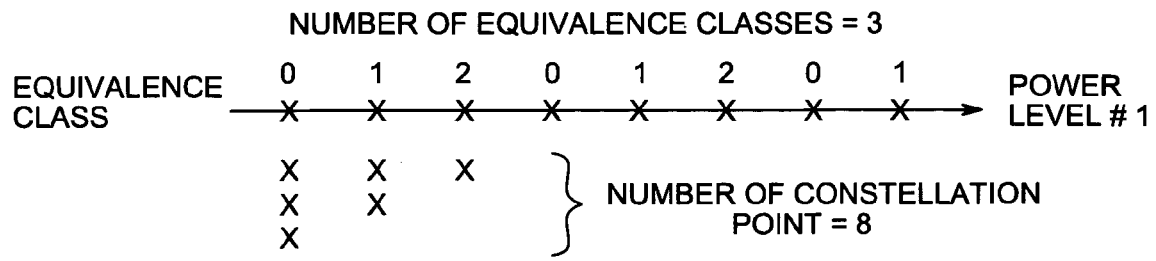
FIG. 2 is the diagrammatic representation of the change of power level through a redefinition of the equivalence classes such that with the same number of constellation points different numbers of equivalence classes result in different power levels.
Figure 2:
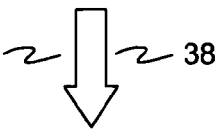
Figure 2:
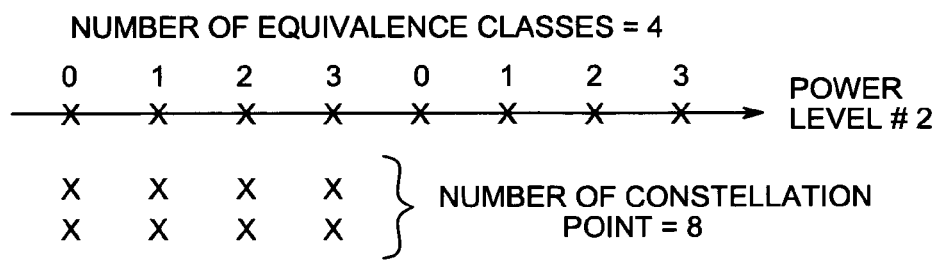

Referring now to FIG. 2, what will be seen is that the number of equivalence classes determines the average transmit power level from the analog modem. As can be seen from equation (9) hereinafter it can be shown that as the number of equivalence classes increases, power also increases.

The constellation points are distributed among the equivalence classes such that three are associated with the Equivalence Class 0, three are associated with Equivalence Class 1 and two are associated with Equivalence Class 2.

Should it be desired to increase the power level at the analog modem transmitter, as illustrated by arrow 38 the equivalence classes are redefined at the digital modem such that the number of equivalence classes in the illustrated embodiment increases to 4. As illustrated, the equivalence classes are now 0, 1, 2 and 3.

To accommodate the same number of constellation points, the constellation points are now assigned two to Class 0, two to Class 1, two to Class 2, and two to Class 3.

Thus the same information may be transmitted by mappings to different numbers of equivalence classes, with the tradeoff being that for the larger number of equivalence classes there is a higher the power level and therefore a higher data rate. Contrarily, for a smaller number of equivalence classes the transmit power level is so low that a lower data rate results. However, if the power level is too high, non-linearities occur and the signal-to-noise ratio degrades such that downstream performance suffers. As long as non-linearities and downstream performance degradations are not severe, it is best to transmit as high as possible while conforming FCC part 68 rule to maximize the upstream data rate. In summary, the target analog transmit power level will be determined by considering and eventually trading off among nonlinearities, intersymbol interferences, downstream performance, and upstream performance.

Figure 3:
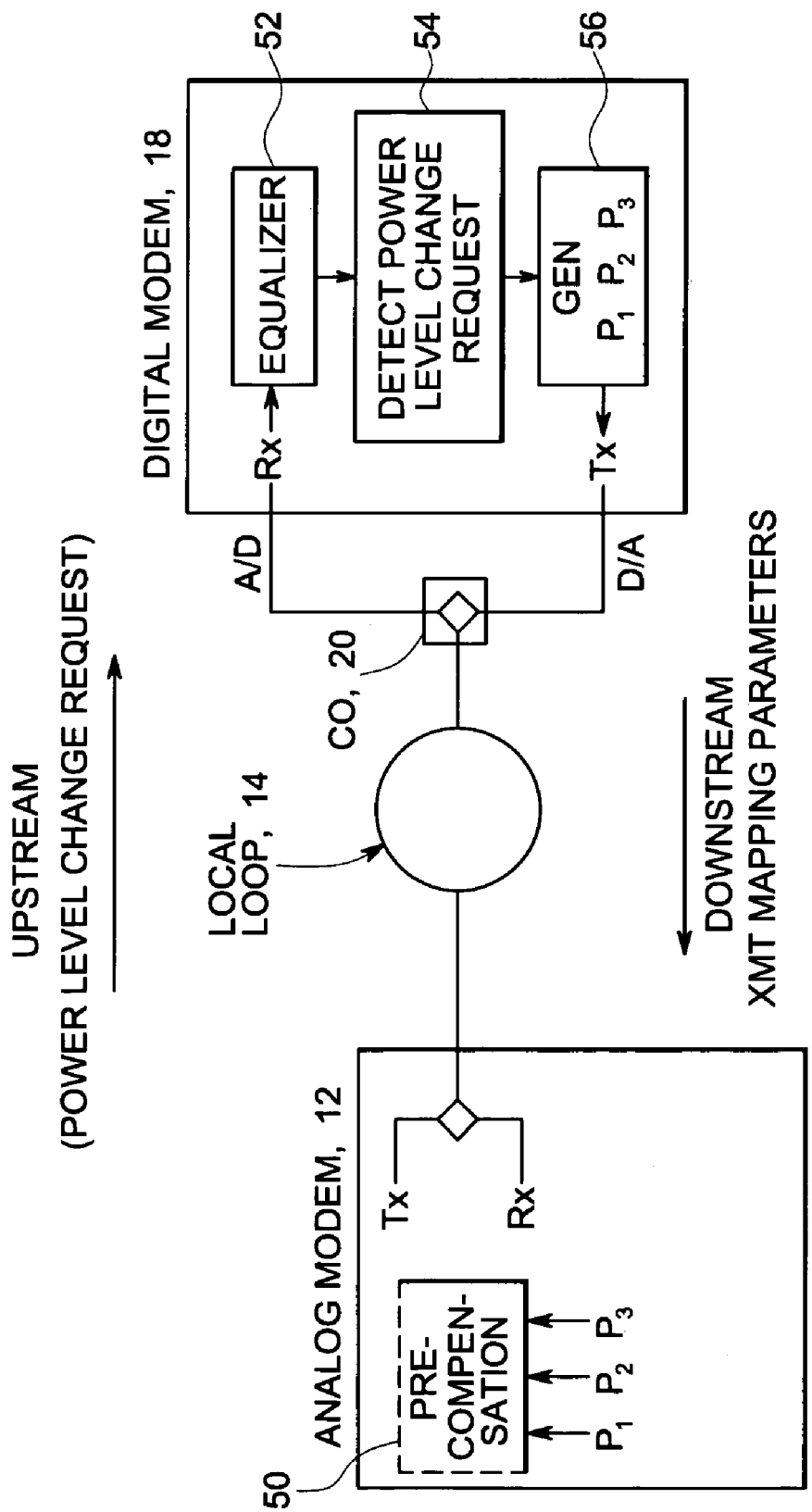
FIG. 3 is a block diagram of a PCM modem system of a FIG. 1 indicating the generation of parameters P1, P2 and P3 which are transmitted back to the analog modem to the pre-compensation circuits in the analog modem such that a power level change request in the upstream direction results in changed mapping parameters being transmitted in the downstream direction.

Referring now to FIG. 3, in operation, unit 54 which is coupled to an equalizer 52 in digital modem 18 detects the power level change request and generates a new set of mapping parameters which is one of the three parameters P1, P2 and P3 which are utilized by pre-compensation circuits 50 in analog modem 12 to completely specify all pre-compensation elements such as the pre-equalizer parameters, the transmit constellation and the transmit mapping parameters.

Figure 4:
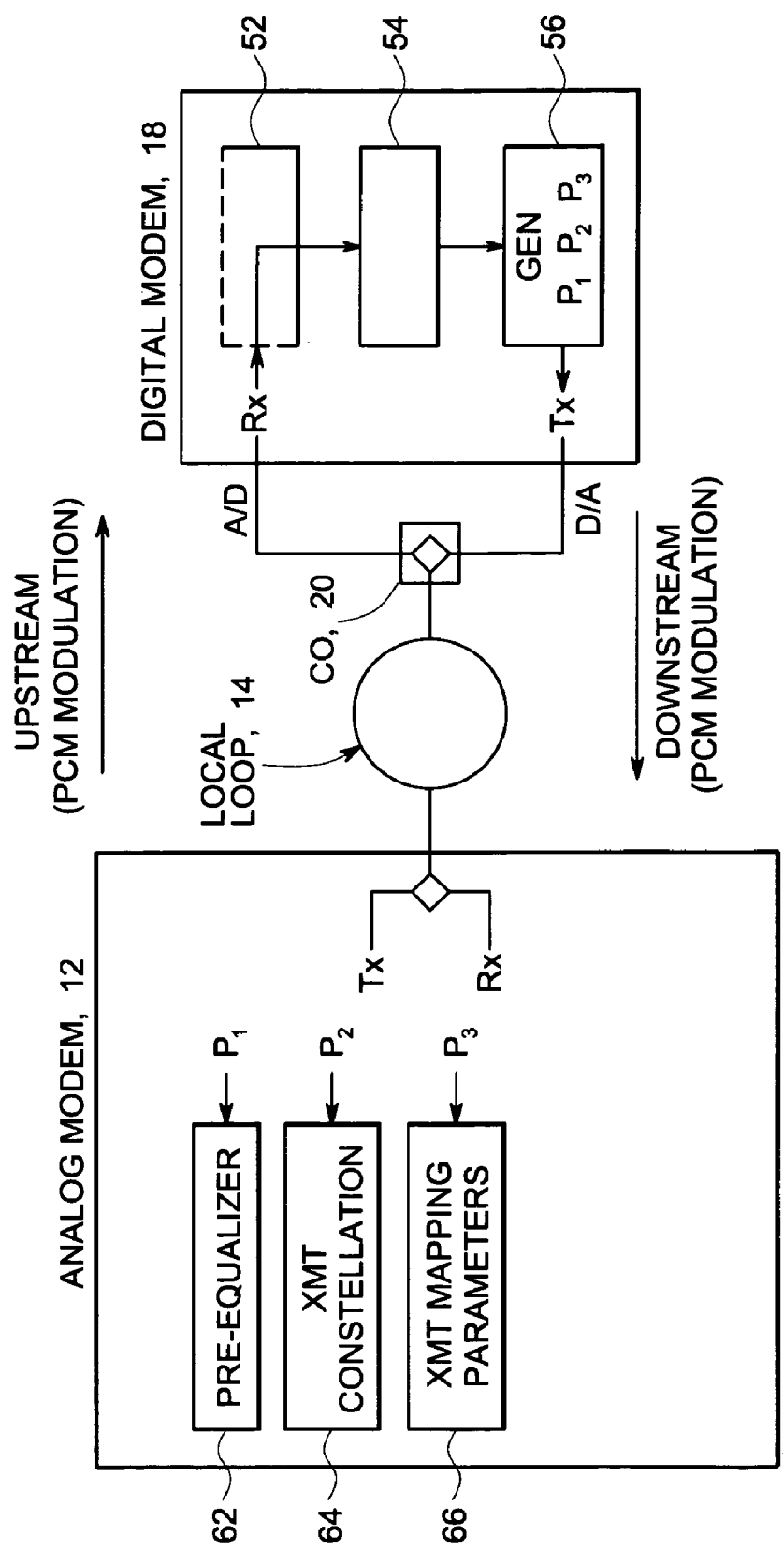
FIG. 4 is a block diagram of a PCM modem system of FIGS. 1 and 3 in which after startup, power level changes can be accomplished through the generation of new P1, P2 and P3 parameters which respectively change the pre-equalizer, transmit constellation and transmit mapping parameters at the analog modem.

Referring to FIG. 4, once the power level change request has been processed and the P1, P2 and P3 parameters have been generated at 56, then pre-equalizer 62, transmit constellation 64 and transmit mapping parameters 66 are set.

Assuming that the transmit constellation is unchanged, then by setting or changing the mapping parameters, one can unequivocally and accurately control the average power level of the transmit section of the analog modem 12.

By so doing one detects the power level at the analog modem on-the-fly, compares it to desired power levels, and communicates changes necessary to the digital modem. The digital modem then adjusts the power level at the analog modem by changing the equivalence classes utilizing the communication process.

What has been described is one of the ways by which the analog modem transmit power level can be adjusted. It should be noted that the transmit power level is also determined by the transmit constellation. However, the transmit constellation itself is hard to change to obtain different upstream transmit powers, since its modification will change the error probability of the upstream receiver. Therefore, in general, only mapping parameters are modified to change upstream transmit power.

One system by which PCM modem communication is established is now described.

Figure 5:
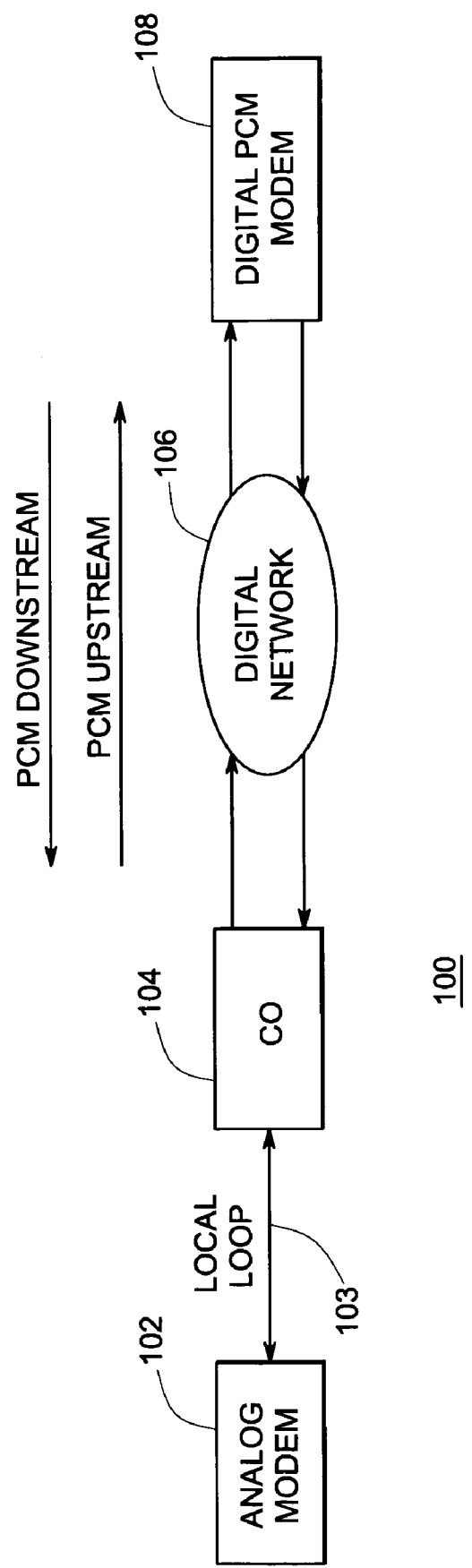
FIG. 5 is a block diagram of a typical analog PCM modem to digital PCM modem communication system.

Referring to FIG. 5, a typical PCM communication system 100 is shown. System 100 includes analog PCM modem 102 connected to a telephone company central office (CO) 104 over a local analog loop or channel 103. There is also included a digital network 106 which is interconnected to CO 104 and to digital PCM modem 108. With this system, PCM data may be transmitted both in the downstream direction (i.e., from digital PCM modem 108 to analog PCM modem 102) and in the upstream direction (i.e., from analog PCM modem 102 to digital PCM modem 108). This type of bi-directional PCM communication system is described in U.S. application Ser. No. 08/724,491, entitled Hybrid Digital/Analog Communication Device, which is assigned to the assignee of the present invention and which is incorporated herein in its entirety by reference.

In the above section a technique for PCM downstream spectral shaping of precoding of data signals is described. In this section there is described a precoding technique for PCM upstream precoding of data signals.

Figure 6:
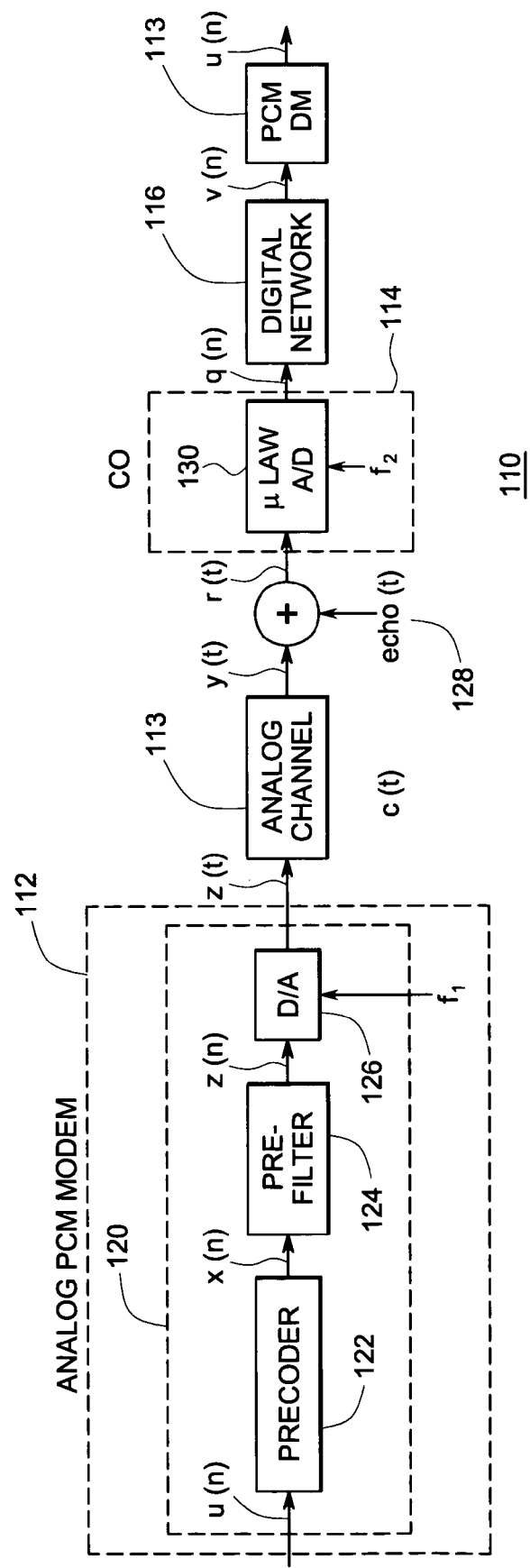
FIG. 6 is a more detailed block diagram depicting PCM upstream transmission.

In FIG. 6 there is shown in block diagram 110, an example of PCM upstream transmission in accordance with this invention. In block diagram 110 there is included analog PCM modem 112 interconnected to analog channel 113. Analog PCM modem 112 includes transmitter 120 having a precoder 122, prefilters 124 and a digital to analog converter (D/A) 126. Precoder 122 receives digital data u(n) and outputs precoded digital data signal x(n). The precoded digital data signal is filtered by profilter 124 to form a signal z(n) which is provided to D/A 126. D/A 126 converts the filtered signal z(n) to analog form and transmits analog signal, z(t), over analog channel 113, having a channel characteristic, c(t).

The analog channel modifies the transmitted signal z(t) to form signal y(t). The signal y(t) then encounters downstream PCM echo, echo(t) 128, that is added to y(t), producing signal r(t). Signal r(t) is received by µ-law (A-law in some countries outside of the US) quantizer 130 in central office (CO) 114 and is quantized according to the µ-law. See International Telecommunications Union, Recommendation G.711, Pulse Code Modulation (PCM) of voice Frequencies, 1972.

The quantized octets (digital values), q(n), are transmitted over digital network 116 at a frequency at 8 kHz where they may be affected by various digital impairments, as discussed below. The possibly affected octets, v(n), are received by digital PCM modem 118 which ideally decodes the octets, v(n), into their corresponding constellation points, y(t), from which the original digital data, u(n) can be recovered. The decoding of v(n) is described in co-pending application entitled System, Device and Method for PCM Upstream Transmission Utilizing an Optimized Transmit Constellation, CX097028, which is assigned to the assignee of the present invention and which is incorporated herein in its entirety by reference.

Before data can be transmitted upstream, the clock ($f_1$) of D/A 126 in analog PCM modem 112 must be synchronized to the clock ($f_2$) of CO 114. This can be achieved by learning the clock from the downstream PCM signal (not shown) and synchronizing the clocks using the technique proposed by U.S. Pat. No. 5,199,046, entitled First and Second Digital Rate Converter Synchronization Device and Method, incorporated herein by reference in its entirety. Once the clocks are synchronized, PCM upstream block diagram 110, FIG. 6, can be represented as equivalent discrete time block diagram 110', FIG. 7, with like components being represented by the same reference numbers containing a prime ('). In block diagram 110' it is assumed that $f_1=f_2$; however, it must be noted that $f_1$ does not have to be equal to $f_2$ as long as the two clocks are synchronized. When $f_1$ is equal to $f_2$, n is the time index for 8 kHz samples, since the clock ($f_2$) of CO 24 is fixed at that frequency.

Figure 7:
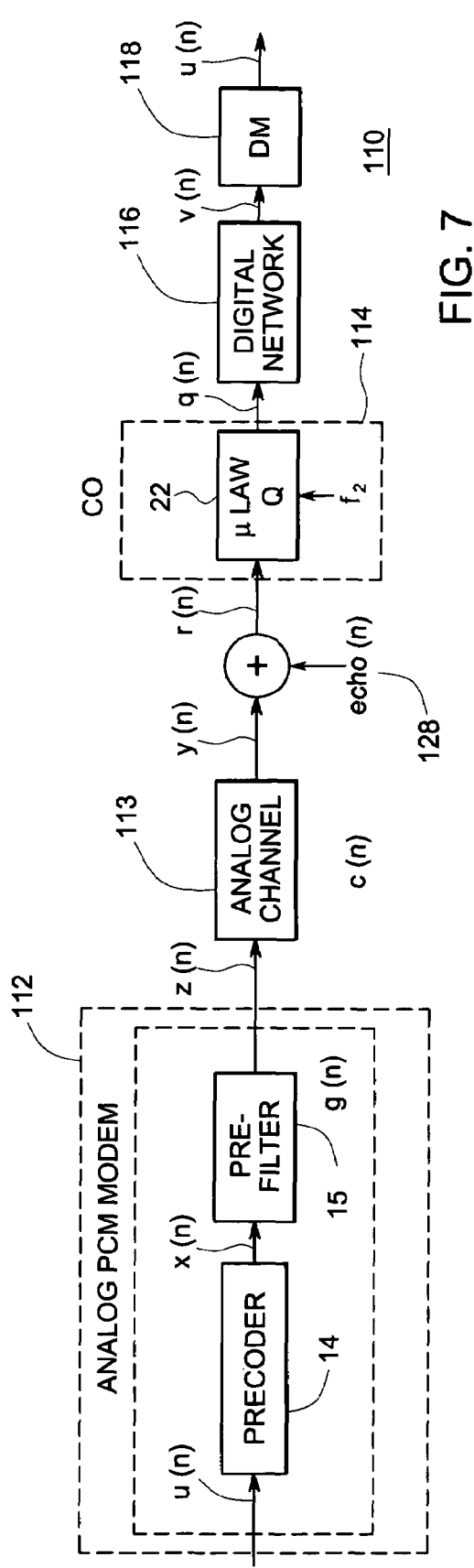
FIG. 7 is an equivalent discrete timing block diagram of the block diagram of FIG. 6.
Figure 8:
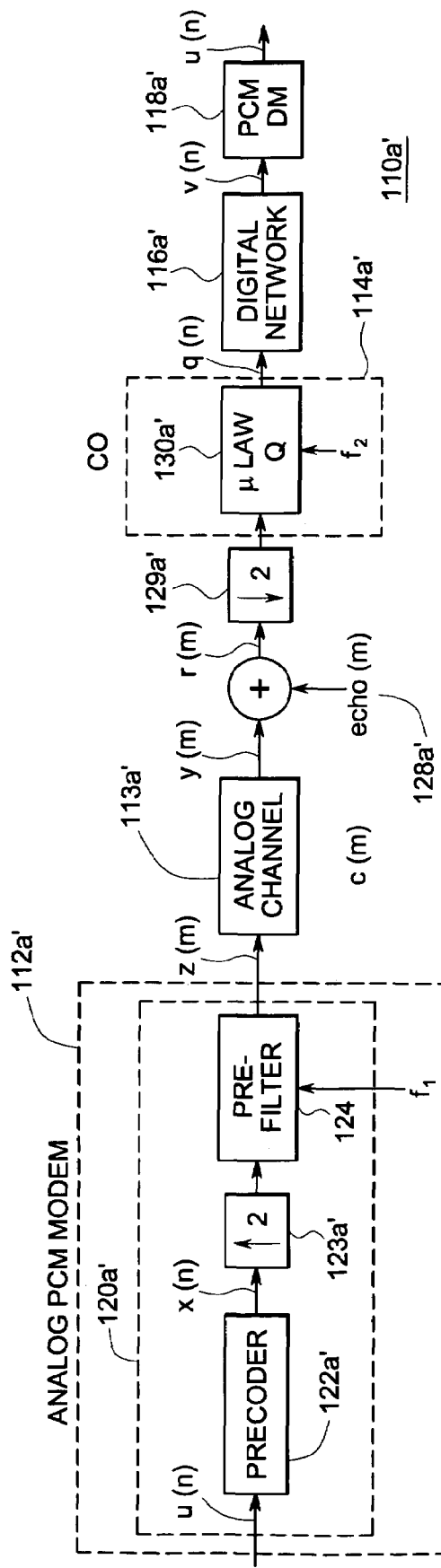
FIG. 8 is equivalent discrete timing block diagram of the block diagram of FIG. 6 with the analog modem sampling rate twice that of the CO sampling rate.

An example where $f_1$, does not equal $f_2$ is depicted in FIG. 8. Equivalent discrete time block diagram 110a', FIG. 8, is the same as equivalent discrete time block diagram 110', FIG. 7, except that there is a 2× up-sampler 123a' in transmitter 120a' and a 2× down-sampler 129a' to account for the fact that $f_1=2f_2$. The variables "m" and "n" are the time indexes for 16 kHz and 8 kHz samples, respectively.

Precoder 122' and prefilters 124', according to this invention, are designed to transmit signal z(n) over analog channel 113 such that predetermined constellation points, y(n), corresponding to digital data u(n) are produced at the input of the µ-law quantizer 130' (in combination with an echo component, echo(n), if present). In other words, the input of the µ-law quantizer 130' is y(n)+e(n) in the presence of echo(n) and just y(n) in the absence of echo(n).

Using the PCM upstream preceding technique described below, or another precoding technique, it is difficult for digital PCM modem 118' to accurately decode u(n) from v(n) in the presence of echo, quantization and digital impairments without a properly designed transmit constellation of points, y(n). It is described in co-pending application CX097028 how to design the transmit constellation for y(n) to enable y(n) (and eventually u(n) from v(n) to be decoded in the presence of echo, quantization and digital impairments with minimized error probability.

Figure 9:
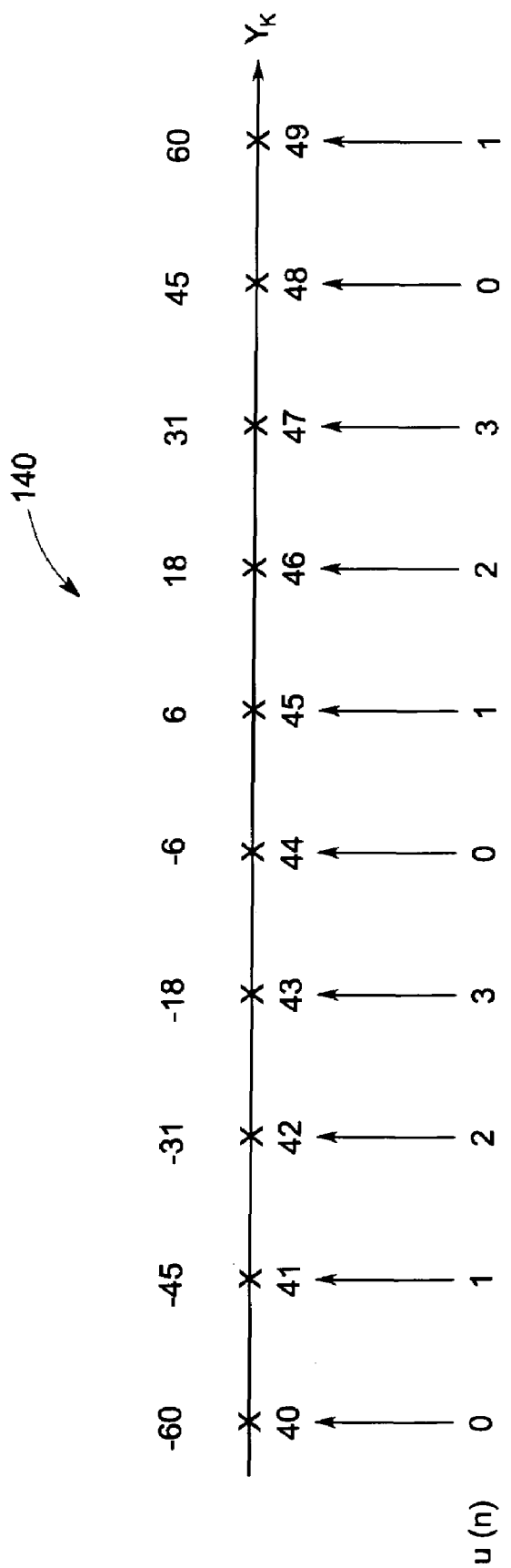
FIG. 9 is an example of a transmit constellation class having a number of equivalence classes.

As described in co-pending application CX097028, for a given connection, depending on the line conditions, a transmit constellation for each robbed bit signaling (RBS) time slot is selected. As an example, transmit constellation 140 is depicted in FIG. 9. This constellation includes ten constellation points, $y_0$–$y_{01}$, ranging in value from −39 to 39. It should be noted that the constellation points, y(n), are not necessary G.711 µ-law levels.

The constellation points y(n) correspond to digital data to be transmitted, u(n). In other words, each constellation point represents a group of data bits and the number of data bits represented by each constellation point depends on the number of points in the constellation (and the number of equivalence classes which are described below). The more points in the constellation, the more bits of data that can be represented. As shown in FIG. 9, digital data u(n) is divided into four groups of bits 0,1,2 and 3, corresponding to 00, 01, 10 and 11, for example. Thus, in this example each constellation point transmitted represents two bits and since the constellation points are transmitted at 8 k/sec, the data rat is 16 kbps. It must be understood that this is a simplified example and data may be mapped into u(n) using any mapping schemes that can map bits into equivalence classes, such as shell mapping or modulus conversion.

According to this invention, the constellation points are grouped into equivalence classes. An equivalence class is a set of typically two or more constellation points which represent the same group of bits or digital data to be transmitted, u(n). With constellation 140, it is shown that constellation points $y_0$(−60), $y_4$(−6) and $y_0$(45) form the equivalence class for u(n)=0. Constellation points $y_1$(−45), $y_0$(6) and $y_9$(60) form the equivalence class for u(n)=1 and constellation points $y_2$(−31), and $y_6$(18) form the equivalence class for u(n)=2. Finally, constellation points $y_3$(−18), and $y_7$(31) form the equivalence class for u(n)=3.

Equivalence class selections generally accomplished as follows. The constellation, with M point, is indexed as $y_0$, $y_1$ ... $y_{M-1}$ in ascending (or descending) order. Assuming u(n) has U values, e.g. U=4 as in the above example, then the equivalence class for u(n)=u contains all the $y_k$'s where k modulo U is u. For example, in FIG. 8, the equivalence class for u(n)=0 is $y_0$, $y_U$, $y_{2U}$, where U=4. Note that each equivalence class is not required to have the same number of constellation points.

The number of supporting data levels for u(n) should be chosen to satisfy the following two conditions: 1) The expansion ratio, which is defined as the ratio between the number of constellation points for y(n) and the number of supporting data levels for u(n), i.e., M.U; and 2) TX power constraints.

The expansion ratio should be large enough to guarantee stable operation. The size of the expansion ratio will depends on the channel characteristics. In voice band modem applications, there is at least one spectral null at f=0. Therefore, we should have an expansion ration of M/U≦2 to make the system stable. In practice, to guarantee the stability, the quality of the channel is determined from the channel response, c(n), and the minimum expansion ration is set accordingly. For example, we can use C(f=4 kHz), the frequency response of the channel at 4 kHz (with respect to other frequencies like 2 kHz), as the quality of the channel and depending on that quality we set the minimum expansion ratio. If the C(f=4 kHz)=C(f=2 kHz), then we set M/U≧2.0. As the C(f=4 kHz) gets smaller and smaller, the expansion ration must be increased.

As described below, precoder 122' selects the appropriate constellation point, $y_k$, from the equivalence class for the date, u(n), to be transmitted and determines a value for x(n) that will produce the selected constellation point at the input to µ-law quantizer 130'.

The precoding scheme, i.e., the design of precoder 122' and prefilter 124', are now described as follows. From the characteristics of analog channel 113', c(n), n=0, 1, ... $N_0$−1, determined by digital PCM modem 118', as described in co-pending application entitled Device and Method for Detecting PCM Upstream Digital Impairments in a Communication Network, CX097029, which is assigned to the assignee of the present invention and which is incorporated herein in its entirety by reference, and optimal target response p(n), n=0, 1, ... ,$N_p$−1, and corresponding prefilter g(n), n=Δ,−Δ+1, ... ,−Δ+$N_0$−1 (where Δ is the decision delay), as shown in FIG. 7, are determined. This problem is similar to determining the optimal feedforward and feedback filters for a decision feedback equalizer (DFE). The prefilter corresponds to feedforward filter of DFE and the target response corresponds to feedback filter of DFE. See, N. Al-Dhahir, et al, "Efficient Computation of the Delay Optimized Finite Length MMSE-DFE", IEEE Transactions On Signal Processing, vol. 44, no. 5, May 1996, pp. 1288–1292. Preferably, the target response p(n) and the filter g(n) will be determined in the analog modem, but they can be determined in the digital modem and transmitted to the analog modem.

The prefilter g(n),n−Δ,−Δ+1, ... ,−Δ+$N_w$−1, and the target response p(n), n=0,1, ... ,$N_p$−1, (where p(0)=1) can be derived given c(n) by minimizing the cost function ξ as follows:

$$\xi = \|g(n)*c(n)-p(n)\|^2 + \alpha\|g(n)\|^2 \quad (4)$$

The first term ensures small intersymbol interface (ISI), i.e., the receiver of digital PCM modem 118' receives what precoder 122' tried to encode, and the second form enforces the transmit (TX) power to stay finite and small. The term α is a constant which should be chosen depending on the application. The larger α is the lower the TX power will be, but at the expense of ISI. A smaller α will give loss ISI at the expense of TX power. Therefore α should be chosen depending on what is desired for ISI and TX power for a given application. As an example, α can be chosen to be the signal to noise ratio (SNR) of the system, which is $\acute{o}^2_n/E(x^2)$ or SNR normalized by channel energy, i.e. $SNR/\|c\|^2$. For $E(x^2)$, we can use −9 dBm which is the power constraint for upstream transmission. This minimization problem is the same as DFE tab initialization problem. The term $\acute{o}^2_n$ can be determined as described in co-pending application CX097028.

The initially determined p(n) and g(n) can always be used if the analog channel c(n) is time invariant. However, in practice, c(n) is time variant, though it is very slow changing. Therefore, some kind of adaptation scheme is necessary. One way to do it is to monitor performance and retrain if the performance goes bad, i.e., re-estimating c(n) in the digital modem 118' and sending a new c(n) back to analog modem 112' to recalculate g(n) and p(n). Another way is to feedback the analog channel error signal, error(n), as described in co-pending application CX097029, from digital modem 118' to analog modem 112' through downstream data transmission and use that error signal to adapt p(n) and g(n).

Once the target response p(n) is determined precoder 122' can be implemented. As explained above, we can send data u(n) by transmitting x(n) such as to produce at the input to quantizer 130', FIG. 7, a constellation point y(n) which is one of the points in the equivalence class of u(n). Which constellation point from the equivalence class of u(n) to use to represent u(n) is usually selected to minimize the TX power of transmitter 120'. The TX power of transmitter 120' is the power of z(n) (or some other metric). In practice, since it is hard to minimize the power of z(n), the power of x(n) is minimized, which is a close approximation of minimizing z(n).

The following is a known relationship among x(n) and p(n):

$$y(n)=p(n)*x(n) \quad (5)$$

where "*" represents convolution. That relationship can be expressed as follows:

$$y(n)=p(0)x(n)+p(1)x(n-1)+\ldots p(N_p)x(n-N_p) \quad (6)$$

Since p(0) is designed to equal to 1, then equation (6) can be simplified as follows:

$$x(n) = y(n) - \sum_{i=1}^{N_p} p(i) \times (n-i) \quad (7)$$

And, since p(n) and the past values of x(n) are known, the appropriate y(n), among the constellation points of the equivalence class of a given u(n), may be selected to minimize $x^2(n)$ in order to minimize the TX power of transmitter 120'.

Or, lookahead (i.e., decision delay) can be introduced to choose y(n). That is, y(n−Δ) can be chosen from the set of equivalence classes for u(n−Δ) can be chosen from the set of equivalence classes for u(n−Δ) to minimize $|x(n-\Delta)^2+|x(n-\Delta+1)|^2+\ldots +|x(n)|^2$, where:

$$x(n-j) = y(n-j)) - \sum_{(n)}^{N_p} p(i) \times (n-j-i) \quad (8)$$

where j=0,1, . . . ,Δ and where y(n-j) is chosen from the set of equivalence classes of u(n-j) (j=0,1, . . . Δ−1).

Figure 10:
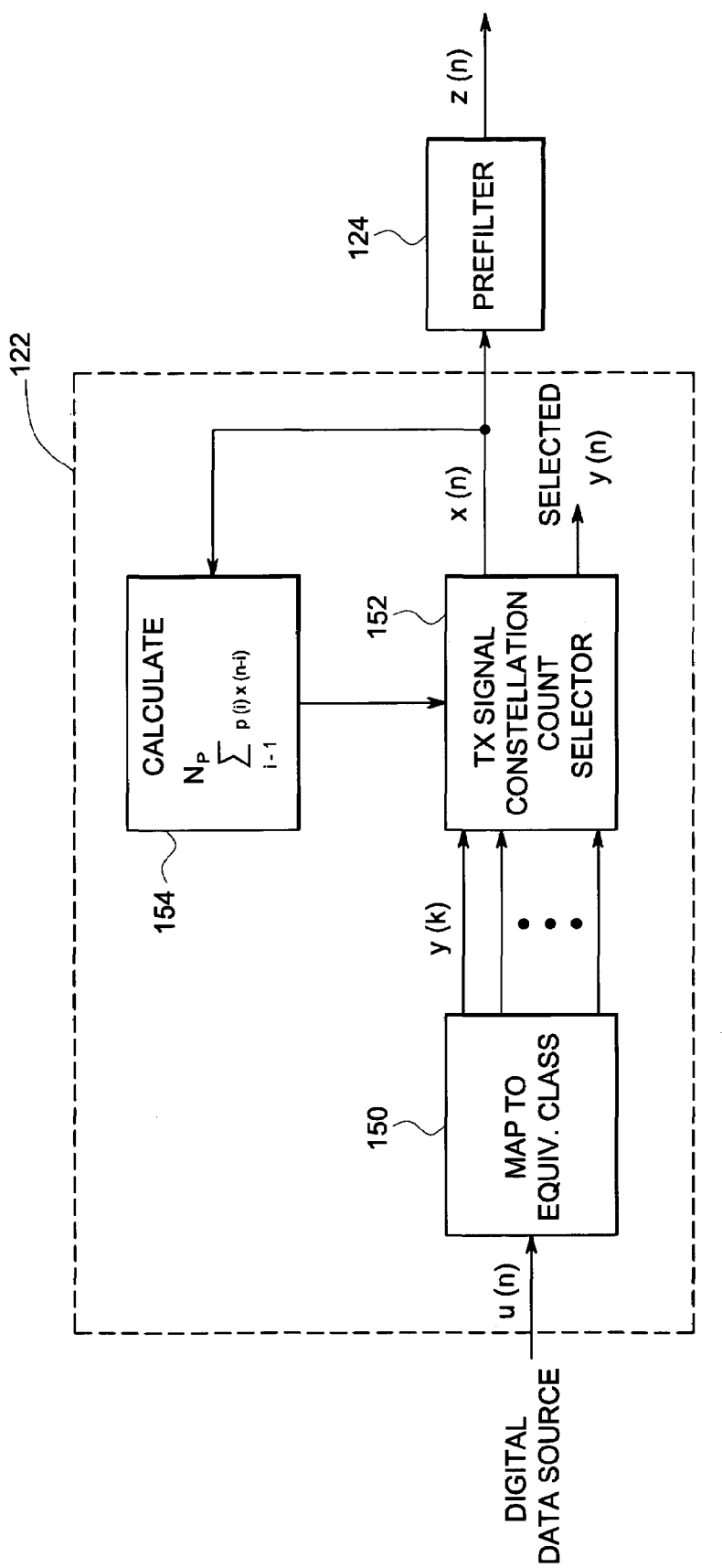
FIG. 10 is a more detailed block diagram of the analog PCM modem transmitter of FIG. 7.

Precoder 122' may be implemented according to this invention as depicted in FIG. 10. Precoder 122' includes a mapping device 150 which receives the incoming digital data u(n) from a digital data source and, depending on the number of bits that can be transmitted with each constellation point, determines for each group of bits the equivalence class associated with the group of bits. Mapping device 150 outputs the constellation points, $y_k$, forming the equivalence class to TX signal/constellation point selector 152 which selects the constellation point $y_k$, form the equivalence class and determines the transmit signal x(n) based on the input from calculation device 154.

Filter device 154 receives the transmit signal x(n) and calculates the summation form (or running filter sum (RFS)) of equation (7) above. Based on the value of the RFS, TX signal/constellation point selector 152 selects the constellation point in the equivalence class that will cause x(n) in equation (7) to be closest in value to zero and calculates to zero and calculates the value of x(n) from the calculated RFX and the selected constellation point. The calculated transmit signal x(n) is then provided to prefilter 124' where x(n) is filtered to form signal z(n) which is transmitted over analog channel 113', FIG. 7.

In order to limit the TX power of transmitter 120', FIG. 7, to keep it within the FCC regulations, the equivalence classes for u(n) must be designed accordingly. With a constellation having a predetermined number of constellation points. If we want to send more data, then more groups of data, u(n), and hence equivalence classes for u(n) will be required. As a result, the constellation points will be further away and will require more transmit power. This is because y(n) is chose as described below according to equation (7) to minimize $x^2(n)$. Therefore, if the constellation points in the equivalence classes are spaced further apart, it is more likely that $x^2(n)$ will be larger. Thus, to reduce TX power, we can make the equivalence class of u(n) closer at the expense of rate. This is depicted in FIGS. 11A and 11B.

Figure 11A:
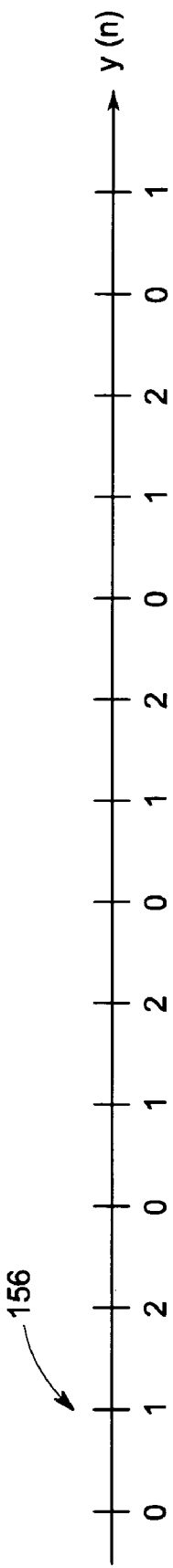
FIG. 11A is an example of the transmit constellation having the equivalence classes illustrated; and, FIG. 11B is yet another example of the transmit constellation having equivalence classes different from those illustrated in FIG. 11A.
Figure 11B:
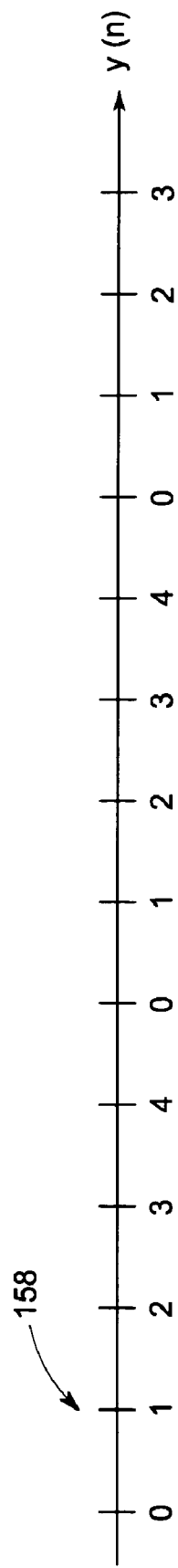

In FIGS. 11A and 11B, both constellations 156, FIG. 11A, and 158, FIG. 11B, have the same number of constellation points; however, constellation 156 has only three equivalence classes u(n)=0,1 and 2 while constellation 158 has five equivalence classes u(n)=0,1,2,3 and 4. Using constellation 158 will require more TX power than constellation 156, but it will be capable of transmitting at a higher data rate.

The approximate TX power (the power of z(n)) can be calculated as follows when U is the number of points desired to support u(n):

$$P_2 \approx |g(n)|2 \frac{1}{U} \sum_{i=0}^{U-1} dist^2(u(n) = i)/12 \quad (9)$$

where $|g(n)|^2$ is the energy of prefilter and dist(u)n)=i) is the minimum distance between the points in the equivalence points. For example, in FIG. 9 dist(u(n)=0)=|−6−(−60)=54. Several values of U should be tried to find out the one which satisfies the power constraints. Note also that this should be done for each time slot.

The transmit constellation selection and equivalence class selection according to this invention may be summarized as follows:

1) Obtain digital impairments, calculate noise variance, $\acute{o}_n^2$, and echo variance, $\acute{o}_a^2$, as described in co-pending application CX097028;
2) From $\acute{o}_a^2$, $\acute{o}_n^2$, and the digital impairments, choose the proper constellation for y(n) for each time, also as described in co-pending application CX097028; and
3) For each time slot, find the number of points that can be supported for u(n) while satisfying the TX power constraints and the minimum expansion ratio to guarantee stable operation. From this U the constellation for y(n), and the equivalence classes for u(n) can be determined.

The above preceding technique which utilizes a one dimensional constellation can be expanded to multi-dimensional constellations by expanding the definition of the equivalence class of u(n). The following references describe various downstream precoding techniques using multi-dimensional constellations: Eyuboglu, Vedat: "Generalized Spectral Shaping for PCM Modems," Telecommunications Industry Association, TR30.1 Meeting, Norcross, Ga., 9–11 Apr. 1997, pages 1–5; Eyuboglu, Vedat; "Convolutional Spectral Shaping," Telecommunication Industry Association, TR30.1 Meeting, Norcross, Ga., 9–11 Apr. 1997; Eyuboglu, Vedat; "More on Convolution Spectral Shaping," ITU Telecommunications Standardization Sector 009, V.pcm Rapporteur Meeting, La Jolla, Calif., 5–7 May 1997; Eyuboglu, Vedat; "Draft Text for Convolutional Spectral Shaping," ITU-T SG 16 Q23 Rapporteur's Meeting, Sep. 2–11, 1997, Sun River, Orgon; Eyuboglu, Vedat; "A Comparison of CSS and Maximum Inversion," Telecommunications Industry Association, TR30.1 Meeting on PCM Modems, Galveston, Tex., 14–16 Oct., 1997; and Eyubglu, Vedat; "Draft Text for Convolutional Spectral Shaping," Telecommunications Industry Association, TR30.1 Meeting Galveston, Tex., 14–16 Oct. 1997.

Moreover, the example described above is for an uncoded system. However, the principals can be easily applied to a coded system, for example a trellis coded system. The only difference in this case is that the equivalence classes are further partitioned into subset, which are used to construct the trellis code.

Having now described a few embodiments of the invention, and some modifications and variations thereto, it should be apparent to those skilled in the art that the foregoing is merely illustrative and not limiting, having been presented by the way of example only. Numerous modifications and other embodiments are within the scope of one of ordinary skill in the art and are contemplated as falling within the scope of the invention as limited only by the appended claims and equivalents thereto.

What is claimed is:

1. In a PCM modem system including an analog modem coupled to a digital modem, a method for controlling the transmit power of the analog modem, comprising the steps of:
    detecting the transmit power level of the analog modem; and,
    adjusting the transmit power level of the analog modem in accordance with the difference between the detected transmit power level and a desired transmit power level,
    wherein said detecting and said adjusting are performed during design of a constellation, and wherein the transmit power level of the analog modem is used as a parameter in the design of the constellation.

2. The method of claim 1, wherein the analog modem sets the analog modem's own transmit power level.

3. The method of claim 1, wherein the transmit power level of the analog modem is set by the digital modem.

4. The method of claim 3, wherein the PCM modem system adjusts the power level of the analog modem by transmitting mapping parameters including equivalence classes used in the analog modem and wherein the transmit power level is proportional to the number of equivalence classes.

5. The method of claim 4, wherein the digital modem sets the analog modem transmit power by changing the number of equivalence classes employed.

6. The method of claim 5, wherein the digital modem estimates the transmit power of the analog modem during a startup mode.

7. The method of claim 6, and further including the step of transmitting the difference between the detected power level and the desired power level to the digital modem for use by the digital modem in changing the number of equivalence classes employed, thus to adjust the power level of a transmitting portion of the analog modem.

8. The method of claim 1, wherein the adjustment of the transmit power level of the analog modem is such as to maintain the transmit power level within FCC set limits.

9. The method of claim 1, wherein the adjusted transmit power level at the analog modem optimizes the PCM modem system by minimizing echo power to minimize noise components due to imperfect echo cancellation and by minimizing non-linearities and downstream performance degradation.

10. In a PCM modem system including an analog modem coupled to a digital modem, a method for controlling the transmit power of either of the modems, comprising the steps of:
    detecting the transmit power level of a modem; and,
    adjusting the transmit power level at the modem in accordance with the difference between the detected transmit power level at the modem and a desired transmit power level,
    wherein said detecting and said adjusting are performed during design of a constellation, and wherein the transmit power level of the analog modem is used as a parameter in the design of the constellation.

11. The method of claim 10, wherein the transmit power level of the modem is set by the other of the modems.

12. In a PCM modem system including an analog modem coupled to a digital modem, a method for controlling a transmit power of either of the modems comprising:
    measuring a transmit power level of at least one of the analog modem and the digital modem; and
    using the measured transmit power level as a parameter in designing a constellation.

13. The method of claim 12, wherein the measured transmit power level is of the analog modem.

14. The method of claim 12, wherein the constellation is designed by the digital modem.

15. The method of claim 12, wherein the PCM modem system adjusts the transmit power of the analog modem by transmitting mapping parameters including equivalence classes used in the analog modem.

16. The method of claim 12, wherein the digital modem sets the transmit power of the analog modem by changing a number of equivalence classes employed.

17. A PCM modem system, comprising:
    a digital modem which designs an initial constellation;
    an analog modem which measures a transmit power of the analog modem for the initial constellation, said analog modem provides information relating to the transmit power of the analog modem for the initial constellation to the digital modem;
    wherein the digital modem uses the information relating to the transmit power of the analog modem for the initial constellation to determine whether to modify the initial constellation.

18. The PCM modem system as in claim 17, wherein the digital modem sets the transmit power of the analog modem by changing a number of equivalence classes employed.

19. The PCM modem system as in claim 17, wherein the information provided from the analog modem to the digital modem is a difference between a measured analog modem transmit power for the initial constellation and a desired analog modem transmit power for the initial constellation.

20. The PCM modem system as in claim 17, wherein the digital modem selectively modifies the initial constellation based on the information relating to the transmit power of the analog modem for the initial constellation.

21. In a PCM modem system including an analog modem coupled to a digital modem, a method for controlling the transmit power of the analog modem, comprising the steps of:
    detecting the transmit power level of the analog modem; and,
    adjusting the transmit power level of the analog modem in accordance with the difference between the detected transmit power level and a desired transmit power level.

22. In a PCM modem system including an analog modem coupled to a digital modem, a method for controlling the transmit power of either of the modems, comprising the steps of:
    detecting the transmit power level of a modem; and,
    adjusting the transmit power level at the modem in accordance with the difference between the detected transmit power level at the modem and a desired transmit power level.

* * * * *